April 27, 1948.                G. A. LYON                2,440,638
                              WHEEL COVER
                           Filed Dec. 9, 1943
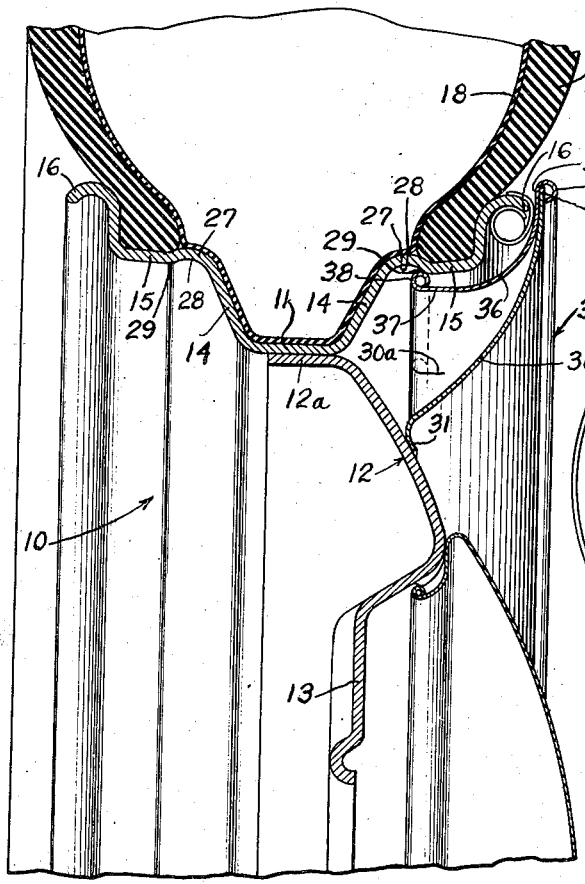
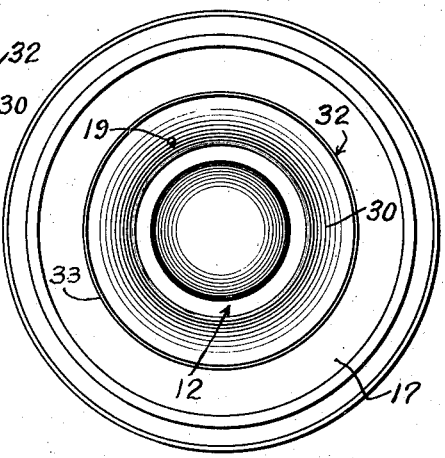
Inventor
GEORGE ALBERT LYON
by The Firm of Charles W Hills Attys.

Patented Apr. 27, 1948

2,440,638

UNITED STATES PATENT OFFICE 2,440,638

WHEEL COVER

George Albert Lyon, Allenhurst, N. J.

Application December 9, 1943, Serial No. 513,546

2 Claims. (Cl. 301—37)

1

This invention is directed to an improved wheel structure and relates more particularly to an improved cover assembly therefor.

It is an important object of the present invention to provide for a cover assembly adapted for disposition over the outer side of a wheel structure, an improved retaining arrangement.

It is another important object of the present invention to provide an improved retaining arrangement for maintaining a cover detachably on the outer side of a wheel structure, said retaining arrangement being adapted to secure the cover at the radially outer part thereof to a radially outer part of the wheel.

It is another object of the present invention to provide for disposition over the outer side of a wheel structure a cover assembly including a part extending radially outwardly to conceal all of or a major portion of the radial outer extremity of a wheel structure and also including retaining means lying in a plane radially inwardly of the radially outer extremity of the cover, thereby to afford attachment of the cover to a radially inner flange of the tire rim.

It is still another object of the present invention to provide for disposition over the outer side of a wheel structure, a cover assembly which includes a circular cover member having a radially outer portion constructed from a synthetic plastic material whereby it possesses characteristics enabling it to be locally, temporarily, resiliently flexed and yet whereby it is self-sustaining as to form and will immediately snap-back into its initial configuration when distorting pressures are relieved therefrom.

It is a still further object of the invention to provide for disposition over the outer side of a wheel structure, a cover assembly including a radially outer annular portion formed from synthetic plastic material or the like, there being also provided improved retaining means formed from a relatively rigid material such as sheet stainless steel or the like, said cover member extending radially outwardly to cover substantially the entire radially outer extremity of the wheel and said retaining member extending radially inwardly of the outer periphery of the cover and also extending axially inwardly for attachment to a flange of the wheel structure.

It is another object of the present invention to provide for disposition over the outer side of a wheel structure, a cover member formed from sheet synthetic plastic material or the like, having means at the radially outer part thereof for strengthening and rigidifying that portion of the

2 cover and also for detachably maintaining the cover on the wheel structure.

In accordance with the general features of the invention, there is provided herein a cover assembly for disposition over the outer side of a wheel structure having a flanged tire rim of the drop center type, there being a circular, radially inwardly facing groove at the junction of certain of said flanges of the rim, and a central load bearing portion, said cover assembly including an annular portion constructed from relatively flexible material having at the radially outer edge thereof an ornamental, retaining annulus formed from a more rigid material such as stainless sheet steel, said retaining annulus including a portion extending over the radially outer margin of the cover and also extending around the edge thereof to the axially inner side to provide attachment means for detachable engagement with the groove in the tire rim.

Other objects and advantages of the invention will become readily apparent from the following description and accompanying drawings, in which:

Figure 1 is a side elevational view of a wheel structure including a cover embodying my invention;

Figure 2 is an enlarged fragmentary cross-sectional view of the wheel structure.

The wheel includes a tire rim 10 having a base flange 11 and a central load bearing portion 12 having a peripheral, axially inwardly extending flange 12a which may be secured to the base flange 11 by means of riveting or welding or the like.

The central load bearing portion 12 is further provided with a central bolt-on flange 13 by means of which the wheel may be secured to an appropriate part of the vehicle such as the brake drum or the like, while the tire rim 10 is further provided with opposite side wall flanges 14, opposite intermediate flanges 15 and opposite edge portions 16, between which may be disposed a tire 17 having an inner tube 18 provided with a valve stem 19.

As will be seen from the drawings, the tire rim 10 is so constructed that the circular junction between the respective side wall flanges 14 and intermediate flanges 15 is curved radially outwardly as at 27, thus to provide a generally radially inwardly opening groove 28 defined on its outer side by a radially inwardly extending shoulder 29.

The cover of the present invention is of a type which is adapted to be applied to the outer side of the wheel in substantial concealing relation to the tire rim 10 and the tire rim and wheel body juncture portion of the wheel. It preferably takes the form of an annulus 30 which may be formed from a suitable relatively flexibly resilient material such as sheet synthetic plastic, although I do not desire to limit myself to the use of this particular material.

As shown, the cover 30 is provided with a cross-sectional configuration substantially simulating the side wall of the tire 17 in the tire rim and extends radially outwardly to a point beyond the edge portion 16 of the rim, while the radially inner margin includes a generally radially inwardly, axially outwardly curved portion 31 which extends radially inwardly beyond the junction of the tire rim 10 and the central load bearing portion 12 and bears against the adjacent portion at the outer surface of the load bearing portion 12 of the wheel.

The cover is completed by the provision of a retaining portion substantially concealed behind the annulus 30 and in one preferred form comprising a relatively rigid annulus 32 formed from relatively rigid material such as sheet metal or the like and preferably from stainless steel sheet to provide a high luster and thus augmenting the ornamental appearance of the cover generally. The annulus 32 includes a peripheral bead 33 which is formed to envelop the radially outer edge 34 of the plastic cover member, this bead merging into a generally radially inwardly extending flange 35 which in turn, through a curvate portion 36, merges into a generally axially inwardly extending snap-on flange 37 having a peripheral radially outwardly projecting snap-on bead 38. The axially inner part of the cover member 32 is preferably provided with a series of circumferentially spaced splits 30a thereby enhancing the resilient springing action of the bead 38.

It will be noted that the curved portion 36 of the retaining annulus 32 is provided with such a cross-sectional configuration that the cover assembly encompasses the tire rim by a relatively broad sweep so that there is provided a space for a wheel balancing weight 39 therebehind, this weight being suitably attached to the edge portion 16 of the tire rim 10.

Preferably the cover member 30 is first formed in the desired size and configuration, whereupon the annulus 32 is disposed against the rear side thereof with the radially outer edge of the annulus extending over the cover 30, whereupon the edge of the annulus may be rolled over by a suitable beading operation into the position shown in Figure 2.

In forming the retaining annulus 32, the bead 38 is so formed that the outer peripheral extremity thereof prescribes a circle slightly greater than that prescribed by the shoulder 29 on the wheel, whereby, when the cover assembly is moved axially inwardly on the wheel, the bead 38 together with the flange 37 is slightly compressed radially inwardly and thus springs slightly radially outwardly when it passes the shoulder 29 to attain the desired retaining engagement between the cover and the wheel.

When it is desired to remove the cover from the wheel structure, the operator may insert his fingers behind the bead 33 and against the axially inner surface of the flange 35 and snap the bead 38 from out of contact with the shoulder 29 on the wheel.

What I claim is:

1. In a cover structure for a wheel including multi-flanged tire rim and body parts, one of the axial flanges of said rim part being provided with a radially outwardly extending depression to provide an annular cover retaining shoulder, a cover for the exposed outer flanges of the rim part including an annular outer portion of relatively flexible material extending radially and axially inwardly from an outer edge of the rim part over flanges thereof to the body part, and an annular retaining portion connected to an outer edge of said outer portion and substantially concealed thereby, said concealed portion extending axially and radially inwardly and terminating in a continuous rear edge formed with a radially outwardly projecting bead for snap-on detachable engagement with said shoulder, both of said portions being convex and curved axially rearwardly inside of the outer flanges of the rim part, said rear edge bead having a circumferential series of generally radially extending splits to enhance the resilient springing action thereof.

2. In a cover structure for a wheel including multi-flanged tire rim and body parts, one of the axial flanges of said rim part being provided with a radially outwardly extending depression to provide an annular cover retaining shoulder, a cover for the exposed outer flanges of the rim part including an annular outer portion of relatively flexible material extending radially and axially inwardly from an outer edge of the rim part over flanges thereof to the body part, and an annular retaining portion connected to an outer edge of said outer portion and substantially concealed thereby, said concealed portion extending axially and radially inwardly entirely clearing the space for wheel balancing weights afforded by the terminal flange of the tire rim and terminating in a continuous rear edge formed with a radially outwardly projecting bead for snap-on detachable engagement with said shoulder, said concealed portion being made of metal and being turned over the outer edge of the outer flexible portion to reinforce the same, said rear edge bead having a circumferential series of generally radially extending splits to enhance the resilient springing action thereof.

GEORGE ALBERT LYON.

REFERENCES CITED

The following references are of record in the file of this patent:

UNITED STATES PATENTS

| Number | Name | Date |
|---|---|---|
| Re. 22,042 | Lyon | Mar. 3, 1942 |
| 1,234,387 | Pugh | July 24, 1917 |
| 2,102,471 | Lyon | Dec. 14, 1937 |
| 2,113,541 | Blank | Apr. 5, 1938 |
| 2,174,087 | Horn | Sept. 26, 1939 |
| 2,239,366 | Lyon | Apr. 22, 1941 |
| 2,279,334 | Lyon | Apr. 14, 1942 |
| 2,329,945 | Schatzman | Sept. 21, 1943 |